United States Patent
Tian et al.

(10) Patent No.: US 10,474,452 B2
(45) Date of Patent: Nov. 12, 2019

(54) FIRMWARE UPGRADE THROUGH GPIO PORT VIA UART PROTOCOL

(71) Applicant: GUANGDONG OPPO MOBILE TELECOMMUNICATIONS CORP., LTD., Dongguan (CN)

(72) Inventors: Chen Tian, Dongguan (CN); Jialiang Zhang, Dongguan (CN); Jun Zhang, Dongguan (CN); Fuchun Liao, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/310,105

(22) PCT Filed: Sep. 24, 2015

(86) PCT No.: PCT/CN2015/090617
§ 371 (c)(1),
(2) Date: Nov. 10, 2016

(87) PCT Pub. No.: WO2017/049548
PCT Pub. Date: Mar. 30, 2017

(65) Prior Publication Data
US 2017/0293483 A1    Oct. 12, 2017

(51) Int. Cl.
*G06F 8/65* (2018.01)
*G06F 8/658* (2018.01)
(Continued)

(52) U.S. Cl.
CPC ............... *G06F 8/658* (2018.02); *G06F 9/24* (2013.01); *H02J 7/0004* (2013.01);
(Continued)

(58) Field of Classification Search
CPC ..... G06F 8/61; G06F 8/65; G06F 8/67; G06F 8/68; G06F 8/71; G06F 8/658; G06F 9/24;
(Continued)

(56) References Cited

U.S. PATENT DOCUMENTS

| 5,689,825 A | 11/1997 | Averbuch et al. |
| 8,890,469 B2 * | 11/2014 | Picard ................... H01M 10/48 320/107 |

(Continued)

FOREIGN PATENT DOCUMENTS

| CN | 1652626 A | 8/2005 |
| CN | 101980159 A | 2/2011 |

(Continued)

OTHER PUBLICATIONS

SIPO, First Office Action for CN Application No. 201580004316, dated Jan. 3, 2019.
(Continued)

*Primary Examiner* — Benjamin C Wu
(74) *Attorney, Agent, or Firm* — Hodgson Russ LLP (57) ABSTRACT

A mobile terminal, a power adapter, and an upgrade method are disclosed. The method includes: downloading firmware upgrade information data of the power adapter by a mobile terminal; and sending the firmware upgrade information data to a processor of the power adapter by the mobile terminal through a data line in a charging port when the mobile terminal is coupled to the power adapter through the charging port to facilitate the processor to upgrade the firmware of the power adapter according to the firmware upgrade information data. The mobile terminal downloads the firmware upgrade information data, and the most updated firmware upgrade information data is transmitted to the power adapter during the process that the mobile terminal connects
(Continued)

to the power adapter, the power adapter is upgraded to solve the problem that the power adapter is difficult to upgrade.

12 Claims, 5 Drawing Sheets

(51) Int. Cl.
  *G06F 9/24* (2006.01)
  *H02J 7/00* (2006.01)
  *H04L 29/08* (2006.01)
(52) U.S. Cl.
  CPC .......... *H02J 7/0042* (2013.01); *H02J 7/0052* (2013.01); *H04L 67/34* (2013.01); *H02J 2007/0096* (2013.01)
(58) Field of Classification Search
  CPC ...... H02J 7/0004; H02J 7/0042; H02J 7/0052; H02J 2007/0096; H04L 67/34
  See application file for complete search history.

(56) References Cited

U.S. PATENT DOCUMENTS

| | | | |
|---|---|---|---|
| 9,667,074 B2* | 5/2017 | Farhi | H02J 7/0004 |
| 9,722,864 B2* | 8/2017 | Hou | H04L 41/0803 |
| 2003/0076072 A1 | 4/2003 | Tojo et al. | |
| 2005/0170827 A1 | 8/2005 | Nagashima | |
| 2005/0253554 A1 | 11/2005 | DiFazio et al. | |
| 2006/0048146 A1* | 3/2006 | Oh | G06F 11/1433 |
| | | | 717/178 |
| 2010/0213891 A1 | 8/2010 | Nishikawa et al. | |
| 2012/0096203 A1* | 4/2012 | He | G06F 13/385 |
| | | | 710/110 |
| 2012/0119696 A1* | 5/2012 | Picard | H01M 10/48 |
| | | | 320/107 |
| 2012/0297211 A1 | 11/2012 | Lee et al. | |
| 2013/0304942 A1* | 11/2013 | Golembeski | G06F 13/385 |
| | | | 710/14 |
| 2014/0081940 A1 | 3/2014 | Everett et al. | |
| 2015/0028824 A1* | 1/2015 | Tse | H02M 1/10 |
| | | | 323/234 |
| 2015/0221414 A1* | 8/2015 | Matsuoka | G06F 1/1632 |
| | | | 174/70 R |
| 2015/0280471 A1* | 10/2015 | Farhi | H02J 7/0004 |
| | | | 320/107 |
| 2016/0380809 A1* | 12/2016 | Hou | H04L 41/0803 |
| | | | 370/254 |
| 2017/0091142 A1* | 3/2017 | Tian | G06F 8/65 |
| 2017/0155263 A1* | 6/2017 | Chen | H02J 7/0044 |
| 2017/0229895 A1* | 8/2017 | Farhi | H02J 7/0075 |
| 2017/0249278 A1* | 8/2017 | Hays | G06F 13/4226 |

FOREIGN PATENT DOCUMENTS

| | | |
|---|---|---|
| CN | 201868931 U | 6/2011 |
| CN | 102931709 A | 2/2013 |
| CN | 103136101 A | 6/2013 |
| CN | 203135171 | 8/2013 |
| CN | 103683977 A | 3/2014 |
| CN | 104239097 A | 12/2014 |
| EP | 1253663 A1 | 10/2002 |
| JP | 2010044500 | 2/2010 |

OTHER PUBLICATIONS

EPO, Office Action for EP Application No. 19157625, dated Jul. 3, 2019.

* cited by examiner

The power adapter receives the firmware upgrade information of the power adapter from the mobile terminal through the data line in the charging port during the process that the power adapter is connected to the mobile terminal through the charging port. — 710

The processor of the power adapter upgrades the firmware of the power adapter according to the firmware upgrade information. — 720

FIRMWARE UPGRADE THROUGH GPIO PORT VIA UART PROTOCOL

CROSS REFERENCE TO RELATED APPLICATION

This application is an International Application No. PCT/CN2015/090617, filed on Sep. 24, 2015, the content of which are incorporated herein by reference in their entirety.

BACKGROUND OF THE DISCLOSURE

1. Field of the Disclosure

The present disclosure relates to a mobile terminal, and more particularly, to a mobile terminal, a power adapter, and an upgrade method thereof.

2. Description of the Related Art

Nowadays, in order to meet fast charging requirements, power adapters of some mobile terminal (such as a cell phone) manufacturers are designed to be intelligent power adapters. Take the quick charging technology of OPPO Mobile Communications Co., Ltd. for example, a main control module of the power adapter is a microcontroller unit (MCU). Under control of the MCU, the OPPO power adapter can adjust its own operation mode according to a current state.

As is known to all, the MCU is programmable. That is, the MCU is able to achieve different functions via upgrading firmware thereof, and only those MCUs with newly upgraded firmware can implement new functions. Hence, in order to improve performance of the MCU, firmware upgrade information data for upgrading firmware of the MCU needs to be timely and conveniently downloaded to the power adapter.

Currently, upgrading firmware of the adapter is performed on a production line. If the firmware upgrade information data downloaded is found to have a bug after the power adapter is sold, the adapter needs to be re-upgraded. Or, if a new function is needed to add to improve performance of the power adapters, then the power adapters that have been sold need to be recalled by the manufacturer which wastes time and manpower. Therefore, these problems need to be solved.

SUMMARY OF THE INVENTION

Embodiments of the present disclosure provide a mobile terminal, a power adapter and an upgrade method thereof to solve the problem that the power adapter is difficult to upgrade.

In a first aspect, a method of upgrading a power adapter is provided. The method includes: downloading firmware upgrade information data of the power adapter by a mobile terminal, the firmware upgrade information data being configured to upgrade firmware of the power adapter; and transmitting the firmware upgrade information data to a processor of the power adapter by the mobile terminal through a data line in a charging port when the mobile terminal is electrically coupled to the power adapter through the charging port to facilitate the processor to upgrade the firmware of the power adapter according to the firmware upgrade information data.

According to an embodiment in conjunction to the first aspect of the present disclosure, the mobile terminal transmits the firmware upgrade information data to the processor of the power adapter through the data line in the charging port includes: converting the firmware upgrade information data to data in accordance with a Universal Asynchronous Receiver/Transmitter (UART) format by the mobile terminal; and transmitting the data in accordance with UART format to a UART port of the processor of the power adapter by the mobile terminal through the data line in the charging port.

According to an embodiment in conjunction to the first aspect of the present disclosure, the mobile terminal converts the firmware upgrade information data into the data in accordance with UART format includes: converting downloaded firmware upgrade information data into the data in accordance with UART format by an application processor (AP) of the mobile terminal; utilizing a General Purpose Input Output (GPIO) port to simulate the UART port by the AP of the mobile terminal so as to transmit the data in accordance with UART format to a Microcontroller Unit (MCU) of the mobile terminal; and transmitting the data in accordance with UART format to the UART port of the processor of the power adapter by the MCU of the mobile terminal through the data line in the charging port.

According to an embodiment in conjunction to the first aspect of the present disclosure, the method further includes transmitting a handshake request message to the power adapter by the MCU of the mobile terminal, the handshake request message being configured to enquire about a version of the firmware currently used by the power adapter, receiving a handshake response message transmitted by the power adapter by the MCU of the mobile terminal, the handshake response message including a message indicating the version of the firmware currently used by the power adapter and determining whether the firmware currently used by the power adapter needs to be upgraded by the MCU of the mobile terminal according to the version of the firmware currently used by the power adapter and a most updated version indicated by the downloaded firmware upgrade information data; transmitting the data in accordance with UART format to the UART port of the processor of the power adapter by the MCU of the mobile terminal through the data line in the charging port including: transmitting the data in accordance with UART format to the UART port of the processor of the power adapter by the MCU of the mobile terminal through the data line in the charging port when determining that the firmware currently used by the power adapter needs to be upgraded.

According to an embodiment in conjunction to the first aspect of the present disclosure, the method further includes determining whether a power supply device plugged in is the power adapter by the AP of the mobile terminal through a first link, wherein the first link connects a Universal Serial Bus (USB) port of the AP and the charging port; and switching the mobile terminal from the first link to a second link through the USB switch when determining that the power supply device plugged in is the power adapter, wherein the second link connects the MCU of the mobile terminal and the charging port; transmitting the data in accordance with UART format to the UART port of the processor of the power adapter by the MCU of the mobile terminal through the data line in the charging port including: transmitting the data in accordance with UART format to the UART port of the processor of the power adapter by the MCU of the mobile terminal through the second link.

According to an embodiment in conjunction to the first aspect of the present disclosure, the firmware upgrade information data is information downloaded from network by the AP in the mobile terminal through a radio frequency controller.

According to an embodiment in conjunction to the first aspect of the present disclosure, the mobile terminal transmits the firmware upgrade information data to the processor of the power adapter through the data line in the charging port during the process that the mobile terminal is electrically coupled to the power adapter through the charging port includes: transmitting the firmware upgrade information data to the processor of the power adapter by the mobile terminal through the data line in the charging port when the power adapter uses a normal charging mode to charge the mobile terminal. The method further includes: switching the mobile terminal from the normal charging mode to a fast charging mode after the power adapter upgrades the firmware of the power adapter according to the firmware upgrade information data, wherein a charging speed of the fast charging mode is greater than a charging speed of the normal charging mode.

According to an embodiment in conjunction to the first aspect of the present disclosure, the charging port is the USB port, the data line in the charging port is at least one of D+ line and D− line in the USB port.

In a second aspect, a method of upgrading a power adapter is provided. The method includes: receiving firmware upgrade information data of the power adapter from a mobile terminal by the power adapter through a data line in a charging port when the power adapter is electrically coupled to the mobile terminal through the charging port; and upgrading firmware of the power adapter by a processor of the power adapter according to the firmware upgrade information data.

According to an embodiment in conjunction to the second aspect of the present disclosure, the power adapter receives the firmware upgrade information data of the power adapter from the mobile terminal through the data line in the charging port includes: receiving data in accordance with a Universal Asynchronous Receiver/Transmitter (UART) format transmitted by the mobile terminal by the power adapter through a UART port of the processor, wherein the data in accordance with UART format is formed by converting the firmware upgrade information data by the mobile terminal.

According to an embodiment in conjunction to the second aspect of the present disclosure, receiving the data in accordance with UART format transmitted by the mobile terminal by the power adapter through the UART port of the processor includes: receiving the data in accordance with UART format transmitted from a General Purpose Input Output (GPIO) port of an application processor (AP) of the mobile terminal by the power adapter through the UART port of the processor, wherein the GPIO port is configured to simulate the UART port to transmit the data in accordance with UART format.

According to an embodiment in conjunction to the second aspect of the present disclosure, the firmware upgrade information data is information downloaded from network by the AP in the mobile terminal through a radio frequency controller.

According to an embodiment in conjunction to the second aspect of the present disclosure, the method further includes: receiving a handshake request message from the mobile terminal by the power adapter, the handshake request message being configured to enquire about a version of the firmware currently used by the power adapter, and transmitting a handshake response message to the mobile terminal by the power adapter, the handshake response message including a message indicating the version of the firmware currently used by the power adapter, receiving the firmware upgrade information data of the power adapter from the mobile terminal by the power adapter including: receiving the firmware upgrade information data of the power adapter from the mobile terminal by the power adapter when the mobile terminal determines that the firmware currently used by the power adapter needs to be upgraded according to a most updated version indicated by the firmware upgrade information data.

According to an embodiment in conjunction to the second aspect of the present disclosure, the power adapter receives the firmware upgrade information data of the power adapter from the mobile terminal through the data line in the charging port during the process that the power adapter is electrically coupled to the mobile terminal through the charging port includes: receiving the firmware upgrade information data of the power adapter from the mobile terminal by the power adapter through the data line in the charging port when the power adapter uses a normal charging mode to charge the mobile terminal. The method further includes: switching the power adapter from the normal charging mode to a fast charging mode after the power adapter upgrades the firmware of the power adapter according to the firmware upgrade information data, wherein a charging speed of the fast charging mode is greater than a charging speed of the normal charging mode.

According to an embodiment in conjunction to the second aspect of the present disclosure, the charging port is a USB port, the data line in the charging port is at least one of D+ line and D− line in the USB port.

In a third aspect, a mobile terminal is provided. The mobile terminal includes: a download controller configured to download firmware upgrade information data of a power adapter, the firmware upgrade information data being configured to upgrade firmware of the power adapter, and a first sending controller configured to transmit the firmware upgrade information data to a processor of the power adapter through a data line in a charging port when the mobile terminal is electrically coupled to the power adapter through the charging port to facilitate the processor to upgrade the firmware of the power adapter according to the firmware upgrade information data.

According to an embodiment in conjunction to the third aspect of the present disclosure, the first sending controller is configured to convert the firmware upgrade information data into data in accordance with a Universal Asynchronous Receiver/Transmitter (UART) format; transmit the data in accordance with UART format to a UART port of the processor of the power adapter through the data line in the charging port.

According to an embodiment in conjunction to the third aspect of the present disclosure, the first sending controller is configured to convert downloaded firmware upgrade information data into the data in accordance with UART format through an application processor (AP) of the mobile terminal; utilize a General Purpose Input Output (GPIO) port to simulate a UART port through the AP of the mobile terminal to transmit the data in accordance with UART format to a microcontroller unit (MCU) of the mobile terminal; transmit the data in accordance with UART format to the UART port of the processor of the power adapter by the MCU of the mobile terminal through the data line in the charging port.

According to an embodiment in conjunction to the third aspect of the present disclosure, the mobile terminal further includes: a second sending controller configured to transmit a handshake request message to the power adapter through the MCU of the mobile terminal, the handshake request message being configured to enquire about a version of the firmware currently used by the power adapter, a receiving controller configured to receive a handshake response message transmitted by the power adapter through the MCU of the mobile terminal, the handshake response message including a message indicating the version of the firmware currently used by the power adapter; and a determination controller configured to determine whether the firmware currently used by the power adapter needs to be upgraded according to the version of the firmware currently used by the power adapter and a most updated version indicated by the downloaded firmware upgrade information data. The first sending controller is configured to transmit the data in accordance with UART format to the UART port of the processor of the power adapter through the MCU of the mobile terminal when determining that the firmware currently used by the power adapter needs to be upgraded.

According to an embodiment in conjunction to the third aspect of the present disclosure, the mobile terminal further includes: a judge controller configured to determine whether a power supply device plugged in is the power adapter through a first link, wherein the first link connects a USB port of the AP and the charging port; and a link switching controller configured to switch the mobile terminal from the first link to a second link through the USB switch when determining that the power supply device plugged in is the power adapter, wherein the second link connects the MCU of the mobile terminal and the charging port. The first sending controller is configured to transmit the data in accordance with UART format to the UART port of the processor of the power adapter through the second link.

According to an embodiment in conjunction to the third aspect of the present disclosure, the firmware upgrade information data is information downloaded from network by the AP in the mobile terminal through a radio frequency controller.

According to an embodiment in conjunction to the third aspect of the present disclosure, the first sending controller is configured to transmit the firmware upgrade information data to the processor of the power adapter through the data line in the charging port when the power adapter uses a normal charging mode to charge the mobile terminal, the mobile terminal further includes: a switch controller configured to switch the power adapter from the normal charging mode to the fast charging mode after the power adapter upgrades the firmware of the power adapter according to the firmware upgrade information data, wherein a charging speed of the fast charging mode is greater than a charging speed of the normal charging mode.

According to an embodiment in conjunction to the third aspect of the present disclosure, the charging port is the USB port, the data line in the charging port is at least one of D+ line and D− line in the USB port.

In a fourth aspect, a power adapter is provided. The power adapter includes: a first receiving controller configured to receive firmware upgrade information data of the power adapter from a mobile terminal through a data line in a charging port when the power adapter is electrically coupled to the mobile terminal through the charging port; and an upgrade controller configured to upgrade firmware of the power adapter through the processor of the power adapter according to the firmware upgrade information data.

According to an embodiment in conjunction to the fourth aspect of the present disclosure, the first receiving controller is configured to receive data in accordance with a Universal Asynchronous Receiver/Transmitter (UART) format transmitted by the mobile terminal through a UART port of the processor, wherein the data in accordance with UART format is formed by converting the firmware upgrade information data by the mobile terminal.

According to an embodiment in conjunction to the fourth aspect of the present disclosure, the first receiving controller is configured to receive the data in accordance with UART format transmitted from a General Purpose Input Output (GPIO) port of an application processor (AP) of the mobile terminal through the UART port of the processor, wherein the GPIO port is configured to simulate the UART port to transmit the data in accordance with UART format.

According to an embodiment in conjunction to the fourth aspect of the present disclosure, the firmware upgrade information data is information downloaded from network by the AP in the mobile terminal through a radio frequency controller.

According to an embodiment in conjunction to the fourth aspect of the present disclosure, the power adapter further includes: a second receiving controller configured to receive a handshake request message from the mobile terminal, the handshake request message being configured to enquire about a version of the firmware currently used by the power adapter, and a sending controller configured to transmit a handshake response message to the mobile terminal, the handshake response message including a message indicating the version of the firmware currently used by the power adapter. The first receiving controller is configured to receive the firmware upgrade information data of the power adapter from the mobile terminal when the mobile terminal determines that the firmware currently used by the power adapter needs to be upgraded according to a most updated version indicated by the firmware upgrade information data.

According to an embodiment in conjunction to the fourth aspect of the present disclosure, the first receiving controller is configured to receive the firmware upgrade information data of the power adapter from the mobile terminal by the power adapter through the data line in the charging port when the power adapter uses a normal charging mode to charge the mobile terminal. The power adapter further includes: a switch controller, configured to switch the power adapter from the normal charging mode to the fast charging mode after the power adapter upgrades the firmware of the power adapter according to the firmware upgrade information data. A charging speed of the fast charging mode is greater than a charging speed of the normal charging mode.

According to an embodiment in conjunction to the fourth aspect of the present disclosure, the charging port is a USB port, the data line in the charging port is at least one of D+ line and D− line in the USB port.

According to the embodiments of the present disclosure, the mobile terminal is utilized to download the firmware upgrade information data of the power adapter, and the most updated firmware upgrade information data is transmitted to the power adapter during the process that the mobile terminal is electrically coupled to the power adapter, the power adapter is thus upgraded to solve the problem that the power adapter is difficult to upgrade.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF THE PREFERRED EMBODIMENTS

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

Current power adapters do not include radio frequency controllers. The current power adapters thus cannot behave like mobile terminals that are able to conveniently download upgrade information data through over the air (OTA) technology to be upgraded. Hence, embodiments of the present disclosure utilize the mobile terminal to download firmware upgrade information data of the power adapter, and transmit the firmware upgrade information data downloaded to the processor of the power adapter through the charging port between the mobile terminal and the power adapter during the process that the mobile terminal is electrically coupled to the power adapter so as to facilitate the processor of the power adapter to upgrade by using the firmware upgrade information data. Reference will now be made to the embodiments to describe the upgrade method of the power adapter according to the embodiments of the present disclosure in detail.

Figure 1:
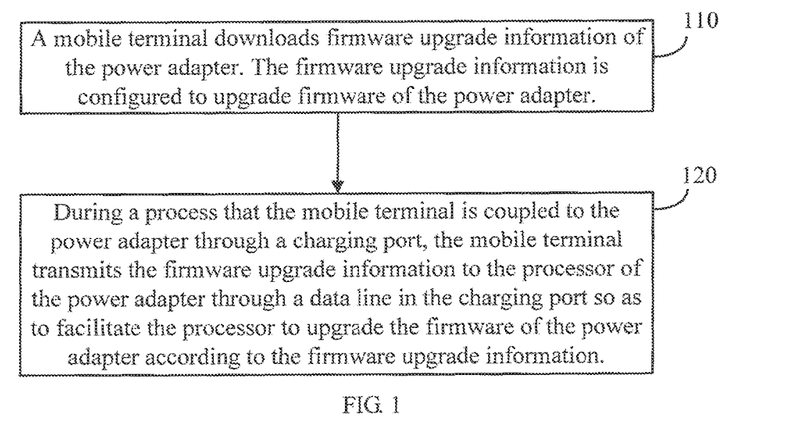
FIG. 1 is a schematic flowchart of an upgrade method of a power adapter according to one embodiment of the present disclosure.

Refer to FIG. 1, FIG. 1 is a schematic flowchart of an upgrade method of a power adapter according to one embodiment of the present disclosure. The method shown in FIG. 1 includes:

Block 110: a mobile terminal downloads firmware upgrade information data of the power adapter. The firmware upgrade information data is configured to upgrade firmware of the power adapter.

In the embodiment of the present disclosure, the firmware upgrade information data of the power adapter is not limited to any specific form. For example, the firmware upgrade information data may be firmware of a processor inside the power adapter.

The mobile terminal may be a cell phone, a tablet, etc.

The mobile terminal may include an application processor (AP) and an MCU (such as a baseband processor). The AP of the mobile terminal may take the responsibility of relevant functions of an intelligent terminal, such as downloading and managing applications (APP). The MCU of the mobile terminal may take the responsibility of some basic functions, such as text messaging and calling. The firmware upgrade information data may be information downloaded from network by the AP in the mobile terminal through a radio frequency controller. For example, the AP downloads the firmware upgrade information data through cellular network or WIFI.

Block 120: when the mobile terminal is electrically coupled to the power adapter through a charging port, the mobile terminal transmits the firmware upgrade information data to the processor of the power adapter through a data line in the charging port so as to facilitate the processor to upgrade the firmware of the power adapter according to the firmware upgrade information data.

According to the embodiment of the present disclosure, the mobile terminal is utilized to download the firmware upgrade information data of the power adapter, and the most updated firmware upgrade information data is transmitted to the power adapter during the process that the mobile terminal is electrically coupled to the power adapter. The power adapter is thus upgraded to solve the problem that the power adapter is difficult to upgrade. When the power adapter is found to have a bug, or when the firmware of the adapter is upgraded, there is no need to return the adapter to the manufacturer. Using the mobile terminal to directly download new firmware upgrade information data from network will work.

The above charging port may be a universal serial bus (USB) port. The USB port may be a typical USB port, or a micro USB port. The data line in the charging port may be at least one of D+ line and D− line in the USB port.

In addition, the processor in the power adapter is not limited according to the embodiment of the present disclosure. For example, the processor may be some model of MCU.

Currently, in the field of quick charging, the main ports of the processor of the power adapter, such as an Inter-Integrated Circuit (I2C) port, are occupied. These ports respectively have tasks need to be completed or functions need to be achieved. Under normal circumstances, a universal asynchronous receiver/transmitter (UART) port of the processor of the power adapter is not fully utilized. Hence, in order to complete the upgrade of the power adapter, the above firmware upgrade information data can be converted into data in accordance with UART format, then the UART port of the processor of the power adapter receives the data in accordance with UART format. The method of converting the firmware upgrade information data into the data in accordance with UART format is not limited according to the embodiment of the present disclosure. The firmware upgrade information data may be converted into the data in accordance with UART format by the mobile terminal, then the mobile terminal transmits the data in accordance with UART format to the UART port of the processor of the power adapter through the data line in the charging port. Conversion of the firmware upgrade information data may be completed by the AP of the mobile terminal, or may be completed by the MCU of the mobile terminal. In the following, a detailed description is provided by taking the AP of the mobile terminal to perform conversion of the firmware upgrade information data as an example.

Optionally, the mobile terminal converting the firmware upgrade information data into the data in accordance with UART format may include: the AP of the mobile terminal converting downloaded firmware upgrade information data into the data in accordance with UART format; the AP of the mobile terminal utilizing a general purpose input output (GPIO) port to simulate the UART port so as to transmit the data in accordance with UART format to the MCU of the mobile terminal; the MCU of the mobile terminal transmitting the data in accordance with UART format to the UART port of the processor of the power adapter through the data line in the charging port.

In the related art, a number of special purpose ports of the AP of the mobile terminal (such as a cell phone) is not sufficient, and many special purpose ports are occupied. For example, the UART port in the AP has been occupied to mainly achieve the function of logging at the port. After the AP of the mobile terminal converts the firmware upgrade information data into the data in accordance with UART format, confusion of functions will be caused if the UART port of the AP is used to output the data in accordance with UART format. In the embodiment of the present disclosure, the GPIO port of the AP is used to simulate the UART port so that the AP of the mobile terminal is utilized to realize the conversion and output of the data in accordance with UART format. Using the GPIO port to simulate the UART port resolves the problem that the conventional AP does not have enough special purpose ports.

The simulation of the UART port by the GPIO port can be realized through delay control of data by the AP and clock transmitting. For example, the AP is controlled to delay for a period of time after transmitting each 1-byte data, and so forth.

In addition, in the above process, the MCU of the mobile terminal serves a function of "passing on messages", which is equivalent to a wire. The data in accordance with UART format transmitted from the GPIO port of the AP is transmitted to the power adapter through the MCU of the mobile terminal. In this manner, a conventional path between the MCU of the mobile terminal and an MCU of the power adapter can be utilized without establishing a new communication link.

Optionally, the method in FIG. 1 further includes: The MCU of the mobile terminal transmitting a handshake request message to the power adapter, the handshake request message being configured to enquire about a version of the firmware currently used by the power adapter; the MCU of the mobile terminal receiving a handshake response message transmitted by the power adapter, the handshake response message including a message indicating the version of the firmware currently used by the power adapter; the MCU of the mobile terminal determining whether the firmware currently used by the power adapter needs to be upgraded according to the version of the firmware currently used by the power adapter and a most updated version indicated by a downloaded firmware upgrade information data; the MCU of the mobile terminal transmitting the data in accordance with UART format to the UART port of the processor of the power adapter through the data line in the charging port including: The MCU of the mobile terminal transmitting the data in accordance with UART format to the UART port of the processor of the power adapter through the data line in the charging port when determining that the firmware currently used by the power adapter needs to be upgraded.

The above handshake process may also be performed by the AP of the mobile terminal.

Optionally, the method in FIG. 1 further includes: the AP of the mobile terminal determining whether a power supply device plugged in is the power adapter through a first link, wherein the first link connects the USB port of the AP and the charging port; the mobile terminal switching the first link to a second link through a USB switch when determining that the power supply device plugged in is the power adapter, the second link connecting the MCU of the mobile terminal and the charging port; the MCU of the mobile terminal transmitting the data in accordance with UART format to the UART port of the processor of the power adapter through the data line in the charging port including: the MCU of the mobile terminal transmitting the data in the UART to the UART port of the processor of the power adapter through the second link.

In block 120, the mobile terminal may transmit the firmware upgrade information data to the power adapter during the charging process, or the mobile terminal may transmit the firmware upgrade information data to the power adapter before charging or after charging. The embodiment of the present disclosure is not limited in this regard. In the following, an embodiment is provided.

Optionally, block 120 may include: The mobile terminal transmitting the firmware upgrade information data to the processor of the power adapter through the data line in the charging port when the power adapter uses a normal charging mode to charge the mobile terminal. The method in FIG. 1 may further include: The mobile terminal switching from the normal charging mode to a fast charging mode after the power adapter upgrades the firmware of the power adapter according to the firmware upgrade information data, wherein a charging speed of the fast charging mode is greater than a charging speed of the normal charging mode.

In the embodiment of the present disclosure, the power adapter first uses the normal charging mode to charge the mobile terminal, and the mobile terminal transmits the firmware upgrade information data to the power adapter during the normal charging process. After the power adapter completes the upgrade, the normal charging mode is switched to the fast charging mode. In this manner, it is ensured that the power adapter can be upgraded in time and the power adapter always uses the most updated firmware to provide the mobile terminal with the charging service.

Reference will now be made to examples to provide a detailed description of the embodiments of the present disclosure. In the following examples, a mobile terminal is a cell phone. The cell phone includes an AP and an MCU. A processor of the power adapter (hereinafter referred to as an adapter) is an MCU. Firmware upgrade information data of the adapter is firmware of the MCU of the adapter. The cell phone downloads the firmware of the MCU of the adapter to the AP through the OTA technology. It should be noted that the examples in FIG. 2 to FIG. 6 are simply for facilitating the understanding of those of ordinary skill in the art, and are not intended to limit the embodiments of the present disclosure. Those of ordinary skill in the art may perform equivalent modifications or variations to the examples shown in FIG. 2 to FIG. 6, and these modifications or variations are within the scope of the embodiments of the present disclosure.

Figure 2:
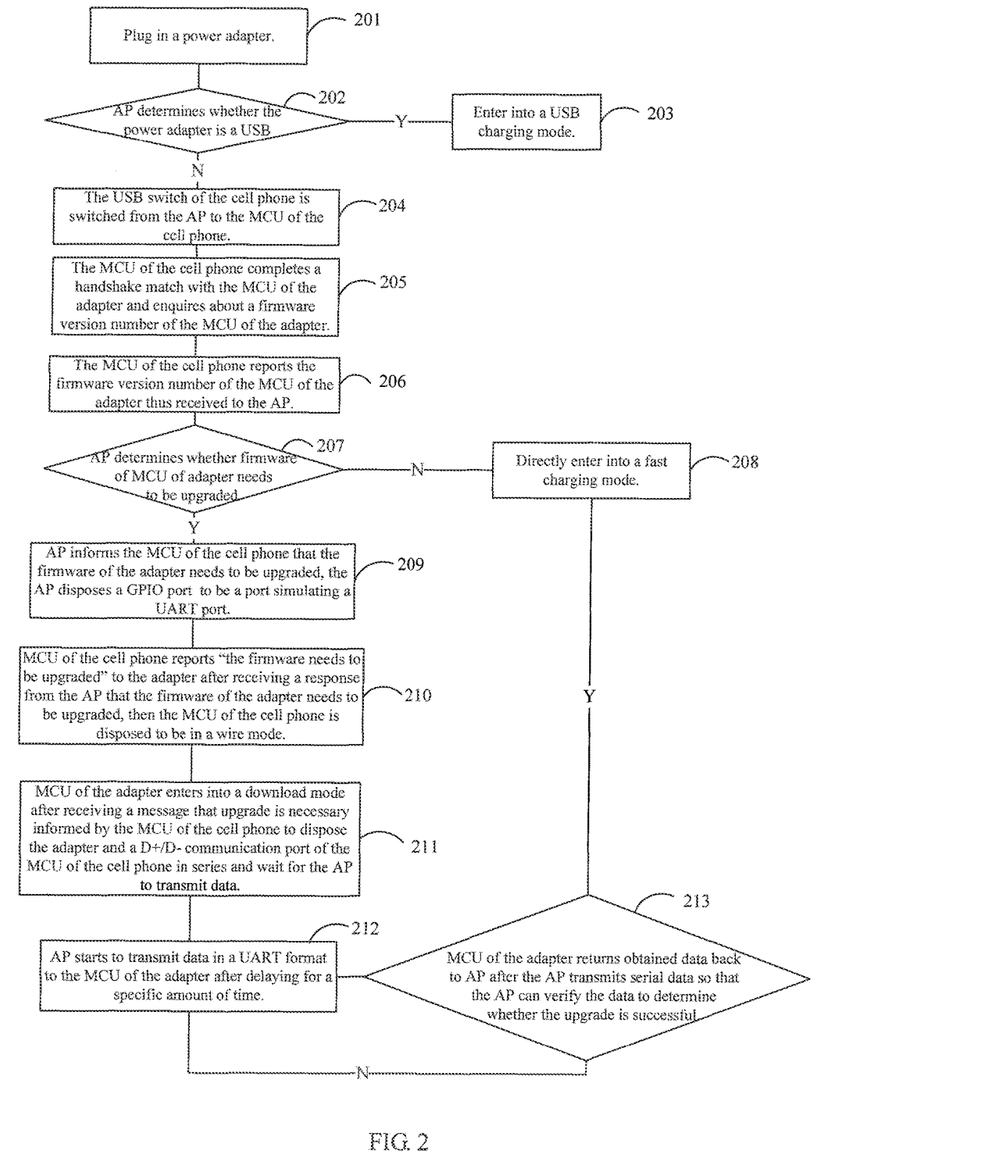
FIG. 2 is a schematic flowchart of an upgrade method of a power adapter according to one embodiment of the present disclosure.

FIG. 2 is a schematic flowchart of an upgrade method of a power adapter according to one embodiment of the present disclosure. The method in FIG. 2 includes:

Block 201: A power supply device is plugged into a cell phone.

Block 202: An AP of the cell phone determines whether the power supply device is an adapter. If the power supply device is not an adapter, go to block 203. If the power supply device is an adapter, go to block 204.

Figure 3:
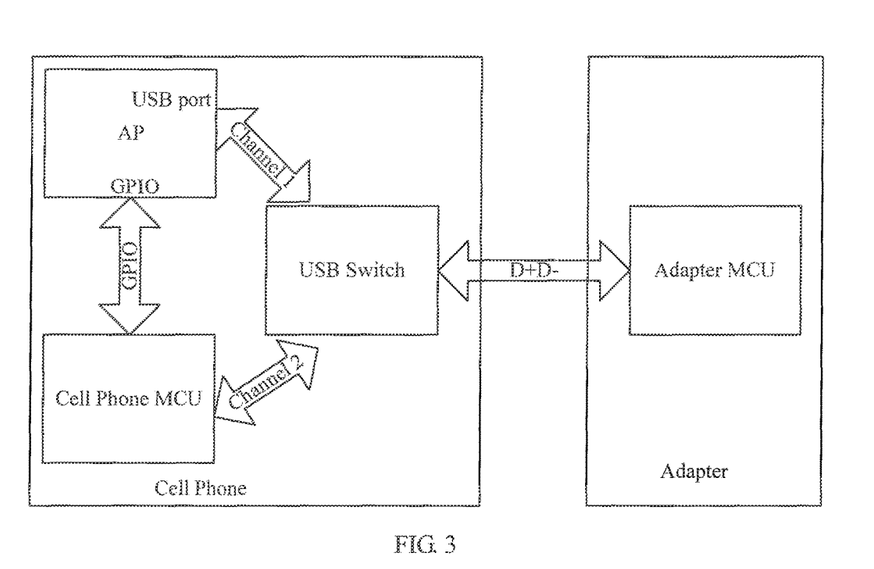
FIG. 3 is a schematic diagram of a system structure of a cell phone and a power adapter according to one embodiment of the present disclosure.
Figure 4:
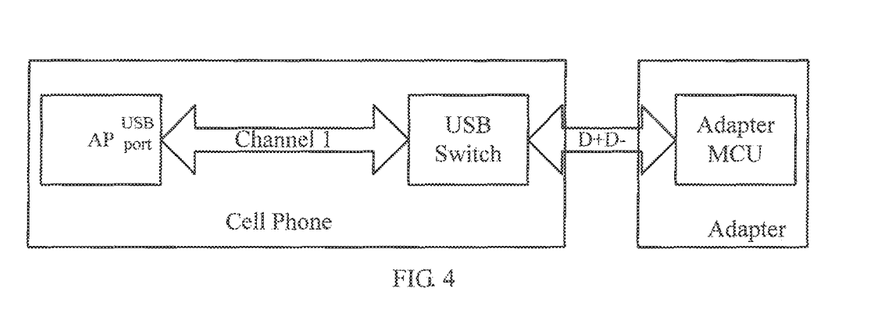
FIG. 4 is a schematic diagram of a communication link between an AP of a cell phone and a power adapter according to one embodiment of the present disclosure.

The cell phone includes the AP and an MCU. Both the AP and the MCU of the cell phone can communicate with an MCU of the adapter. As shown in FIG. 3, a USB switch may be disposed inside the cell phone so that a channel 1 and a channel 2 can be switched. When the USB switch is switched to the channel 1, the AP of the cell phone can communicate with the MCU of the adapter through a D+/D− line in the charging port. When the USB switch is switched to the channel 2, the MCU of the cell phone can communicate with the MCU of the adapter through the D+/D− line in the charging port. A default setting of the USB switch may be channel 1. When the power supply device is plugged in, the AP of the cell phone can identify whether it is the adapter. A communication link for the AP of the cell phone to identify the adapter is shown in FIG. 4.

Block 203: Enter into a non-adapter charging mode.

For example, the power supply device is a computer. The cell phone is plugged into the computer so that the computer can be utilized to provide the cell phone with power.

Block 204: The USB switch of the cell phone is switched from the AP to the MCU of the cell phone.

Block 205: The MCU of the cell phone completes a handshake match with the MCU of the adapter and enquires about a firmware version number of the MCU of the adapter.

Figure 5:
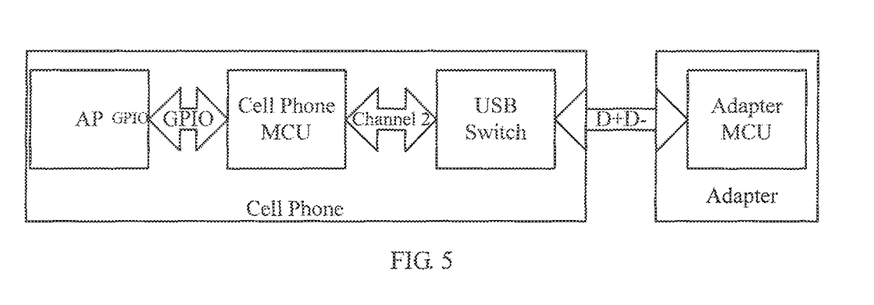
FIG. 5 is a schematic diagram of a communication link between an MCU of a cell phone and a power adapter according to one embodiment of the present disclosure.

A communication link for a handshake negotiation process between the MCU of the cell phone and the adapter may be shown in FIG. 5. Under the circumstances, the setting of the USB switch is channel 2.

Block 206: The MCU of the cell phone reports the firmware version number of the MCU of the adapter thus received to the AP.

Block 207: The AP determines whether firmware of the MCU of the adapter needs to be upgraded. If the firmware of the MCU of the adapter does not need to be upgraded, perform block 208; if the firmware of the MCU of the adapter needs to be upgraded, perform block 209.

Block 208: Directly enter into a fast charging mode.

Block 209: The AP informs the MCU of the cell phone that the firmware of the adapter needs to be upgraded, the AP disposes a GPIO port electrically coupled to the MCU of the cell phone to be a port simulating a UART port.

Block 210: The MCU of the cell phone reports "the firmware needs to be upgraded" to the adapter after receiving a response from the AP that the firmware of the adapter needs to be upgraded, then the MCU of the cell phone is disposed to be in a wire mode.

The wire mode can be understood as shorting the GPIO port that communicates the MCU of the cell phone and the AP and a D+/D− port that communicates the MCU of the cell phone and the adapter together.

Figure 6:
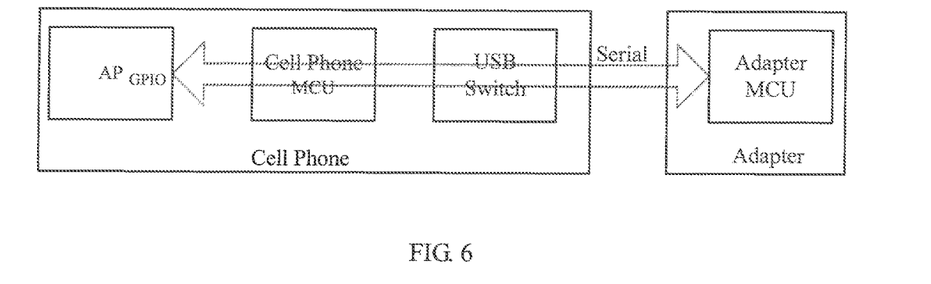
FIG. 6 is a schematic diagram of a data link used by an AP of a cell phone to transmit adapter firmware to a power adapter.

Refer to FIG. 6, FIG. 6 is a communication link between an AP of a cell phone and an MCU of an adapter when upgrading firmware of the adapter, which is equivalent to establishing a direct serial connection between the AP and the MCU of the adapter.

Block 211: The MCU of the adapter enters into a download mode after receiving a message that upgrade is necessary informed by the MCU of the cell phone to dispose the adapter and a D+/D− communication port of the MCU of the cell phone in series and wait for the AP to transmit data.

Block 212: The AP starts to transmit data in a UART format to the MCU of the adapter after delaying for a specific amount of time.

A delay time may be preset. When the delay time is reached, the AP can regard that both the MCU of the cell phone and the MCU of the adapter are ready and start to transmit the data in accordance with UART format to the MCU of the adapter.

Block 213: The MCU of the adapter returns obtained data back to the AP after the AP transmits serial data so that the AP can verify the data to determine whether the upgrade is successful. If the upgrade is determined to be successful, perform block 208; if the upgrade is determined not to be successful, perform block 212.

In the above, the upgrade method of the power adapter according to the embodiments of the present disclosure is described in detail from the view point of the mobile terminal with reference to FIG. 1. In the following, the upgrade method of the power adapter according to the embodiments of the present disclosure is described from the view point of the power adapter with reference to FIG. 7.

Since the interactions between, relevant features and functions of the power adapter and the mobile terminal from the view point of the mobile terminal correspond to those from the view point of the power adapter, a repeat description is not provided wherever possible to simplify matters.

Figure 7:
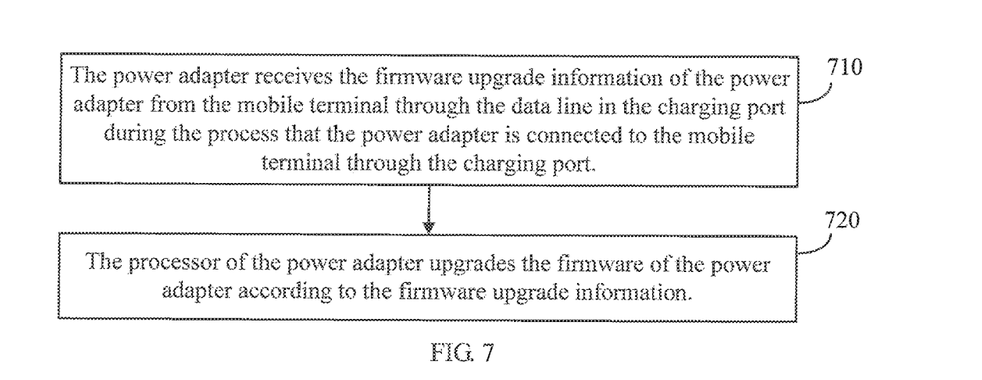
FIG. 7 is a schematic flowchart of an upgrade method of a power adapter according to one embodiment of the present disclosure.

FIG. 7 is a schematic flowchart of an upgrade method of a power adapter according to one embodiment of the present disclosure. The method in FIG. 7 includes:

Block 710: The power adapter receives the firmware upgrade information data of the power adapter from the mobile terminal through the data line in the charging port during the process that the power adapter is electrically coupled to the mobile terminal through the charging port.

Block 720: The processor of the power adapter upgrades the firmware of the power adapter according to the firmware upgrade information data.

According to the embodiment of the present disclosure, the mobile terminal is utilized to download the firmware upgrade information data of the power adapter, and transmit the most updated firmware upgrade information data to the power adapter during the process that the mobile terminal is electrically coupled to the power adapter. The power adapter is thus upgraded to resolve the problem that the power adapter is difficult to upgrade.

Optionally, block 710 may include: The power adapter receives the data in accordance with UART format transmitted from the mobile terminal through the UART port of the processor. The data in accordance with UART format is formed by converting the firmware upgrade information data by the mobile terminal.

Optionally, the power adapter receives the data in accordance with UART format transmitted from the mobile terminal through the UART port of the processor includes: The power adapter receiving the data in accordance with UART format transmitted from the GPIO port of the AP of the mobile terminal through the UART port of the processor. The GPIO port is used for simulating the UART port so as to transmit the data in accordance with UART format.

Optionally, the firmware upgrade information data is information downloaded from network by the AP in the mobile terminal through the radio frequency controller.

Optionally, the method in FIG. 7 may further include: The power adapter receiving the handshake request message from the mobile terminal, the handshake request message being configured to enquire about the version of the firmware currently used by the power adapter, the power adapter transmitting the handshake response message to the mobile terminal, the handshake response message including the message indicating the version of the firmware currently used by the power adapter; the power adapter receiving the firmware upgrade information data of the power adapter from the mobile terminal including: The power adapter receiving the firmware upgrade information data of the power adapter from the mobile terminal when the mobile terminal determines that the firmware currently used by the power adapter needs to be upgraded according to the most updated version indicated by the firmware upgrade information data.

Optionally, the power adapter receiving the firmware upgrade information data of the power adapter from the mobile terminal through the data line in the charging port during the process that the power adapter is electrically coupled to the mobile terminal through the charging port includes: The power adapter receiving the firmware upgrade information data of the power adapter from the mobile terminal through the data line in the charging port during the process that the power adapter uses the normal charging mode to charge the mobile terminal; the method further includes: The power adapter switching from the normal charging mode to the fast charging mode after the power adapter upgrades the firmware of the power adapter according to the firmware upgrade information data, wherein the charging speed of the fast charging mode is greater than the charging speed of the normal charging mode.

Optionally, the charging port is the USB port. The data line in the charging port is at least one of the D+ line and the D− line in the USB port.

In the above, the upgrade methods of the power adapters according to the embodiments of the present disclosure are described in detail with reference to FIG. 1 to FIG. 7. In the following, the mobile terminals and power adapters according to the embodiments of the present disclosure are described in detail with reference to FIG. 8 to FIG. 11. The mobile terminals and the power adapters in FIG. 8 to FIG. 11 can realize the various steps performed by the mobile terminals and the power adapters shown in FIG. 1 to FIG. 7. A detailed description is not provided to avoid repetition.

Figure 8:
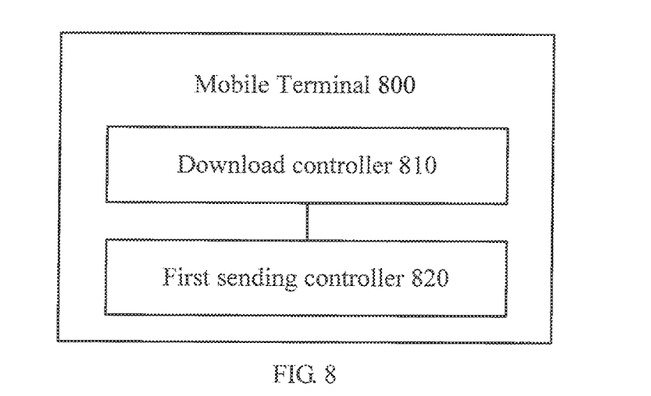
FIG. 8 is a schematic block diagram of a mobile terminal according to one embodiment of the present disclosure.

FIG. 8 is a schematic block diagram of a mobile terminal according to one embodiment of the present disclosure. A mobile terminal 800 in FIG. 8 includes:

A download controller 810 configured to download the firmware upgrade information data of the power adapter. The firmware upgrade information data is configured to upgrade the firmware of the power adapter.

A first sending controller 820 configured to transmit the firmware upgrade information data to the processor of the power adapter through the data line in the charging port during the process that the mobile terminal 800 is electrically coupled to the power adapter through the charging port to facilitate the processor to upgrade the firmware of the power adapter according to the firmware upgrade information data.

In the embodiment of the present disclosure, the mobile terminal is utilized to download the firmware upgrade information data of the power adapter, and transmit the most updated firmware upgrade information data to the power adapter during the process that the mobile terminal is electrically coupled to the power adapter. The power adapter is thus ungraded to solve the problem that the power adapter is difficult to upgrade.

Optionally, the first sending controller 820 may be configured to convert the firmware upgrade information data into the data in accordance with UART format; transmit the data in accordance with UART format to the UART port of the processor of the power adapter through the data in the charging port.

Optionally, the first sending controller 820 may be specifically configured to convert the downloaded firmware upgrade information data into the data in accordance with UART format through the AP of the mobile terminal 800; transmit the data in accordance with UART format to the MCU of the mobile terminal 800 by utilizing the GPIO port to simulate the UART port through the AP of the mobile terminal 800; transmit the data in accordance with UART format to the UART port of the processor of the power adapter through the data line in the charging port through the MCU of the mobile terminal 800.

Optionally, the mobile terminal 800 may further include: The second sending controller configured to transmit the handshake request message to the power adapter through the MCU of the mobile terminal, the handshake request message being configured to enquire about the version of the firmware currently used by the power adapter; the receiving controller configured to receive the handshake response message transmitted by the power adapter through the MCU of the mobile terminal, the handshake response message including the message indicating the version of the firmware currently used by the power adapter, the determination controller configured to determine whether the firmware currently used by the power adapter needs to be upgraded according to the version of the firmware currently used by the power adapter and the most updated version indicated by the downloaded firmware upgrade information data. The first sending controller 820 is configured to transmit the data in accordance with UART format to the UART port of the processor of the power adapter through the MCU of the mobile terminal when determining that the firmware currently used by the power adapter needs to be upgraded.

Optionally, the mobile terminal 800 may further include: a judge controller configured to determine whether the power supply device plugged in is the power adapter through the first link, wherein the first link connects the USB port of the AP and the charging port; a link switching controller configured to switch the mobile terminal from the first link to the second link through the USB switch when determining that the power supply device plugged in is the power adapter, where the second link connects the MCU of the mobile terminal and the charging port. The first sending controller 820 is configured to transmit the data in accordance with UART format to the UART port of the processor of the power adapter through the second link.

Optionally, the firmware upgrade information data is the information downloaded from the network by the AP in the mobile terminal through the radio frequency controller.

Optionally, the first sending controller 820 may be specifically configured to transmit the firmware upgrade information data to the processor of the power adapter through the data line in the charging port during the process that the power adapter uses the normal charging mode to charge the mobile terminal 800. The mobile terminal 800 may further include: a switch controller configured to switch from the normal charging mode to the fast charging mode after the power adapter upgrades the firmware of the power adapter according to the firmware upgrade information data, wherein the charging speed of the fast charging mode is greater than the charging speed of the normal charging mode.

Optionally, the charging port may be the USB port. The data line in the charging port is at least one of the D+ line and the D− line in the USB port.

Figure 9:
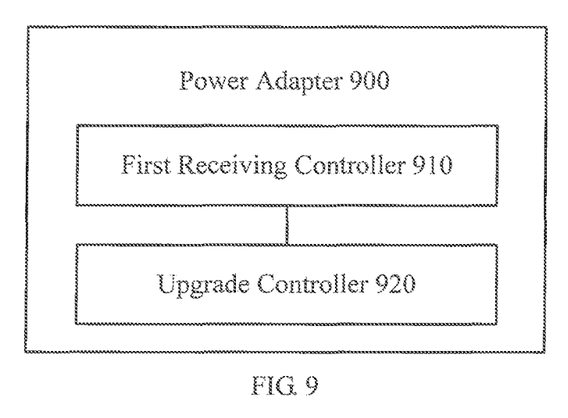
FIG. 9 is a schematic block diagram of a power adapter according to one embodiment of the present disclosure.

FIG. 9 is a schematic block diagram of a power adapter according to one embodiment of the present disclosure. The power adapter 900 in FIG. 9 includes:

A first receiving controller 910 configured to receive the firmware upgrade information data of the power adapter 900 from the mobile terminal through the data line in the charging port during the process that the power adapter 900 is electrically coupled to the mobile terminal through the charging port;

An upgrade controller 920 configured to upgrade the firmware of the power adapter 900 through the processor of the power adapter 900 according to the firmware upgrade information data.

According to the embodiment of the present disclosure, the mobile terminal is utilized to download the firmware upgrade information data of the power adapter, and transmit the most updated firmware upgrade information data to the power adapter during the process that the mobile terminal is electrically coupled to the power adapter so as to upgrade the power adapter. The problem that the power adapter is difficult to upgrade is solved.

Optionally, the first receiving controller 910 may be specifically configured to receive the data in accordance with UART format transmitted by the mobile terminal through the UART port of the processor. The data in accordance with UART format is formed by converting the firmware upgrade information data by the mobile terminal.

Optionally, the first sending controller 910 may be specifically configured to receive the data in accordance with UART format transmitted from the GPIO port of the AP of the mobile terminal through the UART port of the processor. The GPIO port is configured to simulate the UART port to transmit the data in accordance with UART format.

Optionally, the firmware upgrade information data may be the information downloaded from the network by the AP in the mobile terminal through the radio frequency controller.

Optionally, the power adapter 900 may further include: a second receiving controller configured to receive the handshake request message from the mobile terminal, the handshake request message being configured to enquire about the version of the firmware currently used by the power adapter 900; a sending controller configured to transmit the handshake response message to the mobile terminal, the handshake response message including the message indicating the version of the firmware currently used by the power adapter 900. The first receiving controller 910 may be specifically configured to receive the firmware upgrade information data of the power adapter 900 from the mobile terminal when the mobile terminal determines that the firmware currently used by the power adapter 900 needs to be upgraded according to the most updated version indicated by the firmware upgrade information data.

Optionally, the first receiving controller 910 may be specifically configured to allow the power adapter 900 to receive the firmware upgrade information data of the power adapter 900 from the mobile terminal through the data line in the charging port during the process that the power adapter 900 uses the normal charging mode to charge the mobile terminal. The power adapter 900 may further include: a switch controller configured to switch the power adapter 900 from the normal charging mode to the fast charging mode after the power adapter 900 upgrades the firmware of the power adapter 900 according to the firmware upgrade information data, wherein the charging speed of the fast charging mode is greater than the charging speed of the normal charging mode.

Optionally, the charging port is the USB port. The data line in the charging port is at least one of the D+ line and the D− line in the USB port.

Figure 10:
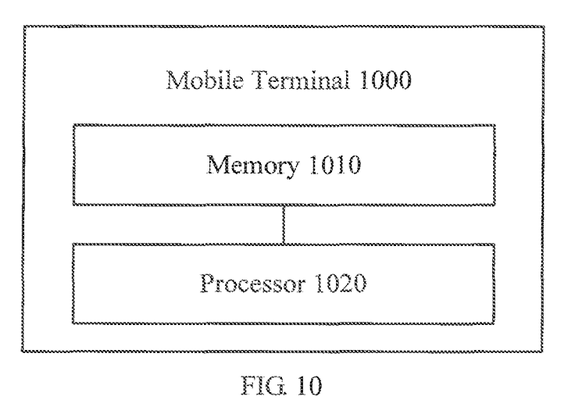
FIG. 10 is a schematic block diagram of a mobile terminal according to one embodiment of the present disclosure.

FIG. 10 is a schematic block diagram of a mobile terminal according to one embodiment of the present disclosure. A mobile terminal 1000 in FIG. 10 includes:

a memory 1010 configured to store a program;

a processor 1020 configured to execute the program, when the program is executed, the processor 1020 being configured to download the firmware upgrade information data of the power adapter, the firmware upgrade information data being configured to upgrade the firmware of the power adapter; transmit the firmware upgrade information data to the processor of the power adapter through the data line in the charging port during the process that the mobile terminal 1000 is electrically coupled to the power adapter through the charging port to facilitate the processor to upgrade the firmware of the power adapter according to the firmware upgrade information data.

In the embodiment of the present disclosure, the mobile terminal is utilized to download the firmware upgrade information data of the power adapter, and the most updated firmware update information is transmitted to the power adapter during the process that the mobile terminal is electrically coupled to the power adapter, the power adapter is thus upgraded to solve the problem that the power adapter is difficult to upgrade.

Optionally, the processor 1020 may be specifically configured to convert the firmware upgrade information data into the data in accordance with UART format; transmit the data in accordance with UART format to the UART port of the processor of the power adapter through the data line in the charging port.

Optionally, the processor 1020 includes the AP and the MCU. The AP may be specifically configured to convert the downloaded firmware upgrade information data into the data in accordance with UART format; the GPIO port is utilized to simulate the UART port to transmit the data in accordance with UART format to the MCU of the mobile terminal 1000; the MCU transmits the data in accordance with UART format to the UART port of the processor of the power adapter through the data line in the charging port.

Optionally, the processor 1020 may include the MCU. The MCU transmits the handshake request message to the power adapter, the handshake request message is configured to enquire about the version of the firmware currently used by the power adapter; the MCU receives the handshake response message transmitted by the power adapter, the handshake response message includes the message indicating the version of the firmware currently used by the power adapter; the MCU determines whether the firmware currently used by the power adapter needs to be upgraded according to the version of the firmware currently used by the power adapter and the most updated version indicated by the downloaded firmware upgrade information data; the MCU transmits the data in accordance with UART format to the UART port of the processor of the power adapter when determining that the firmware currently used by the power adapter needs to be upgraded.

Optionally, the processor 1020 may further include the AP. The AP determines whether the power supply device plugged in is the power adapter through the first link, the first link connects the USB port of the AP and the charging port; the AP switches from the first link to the second link through the USB switch when determining that the power supply device plugged in is the power adapter, the second link connects the MCU of the mobile terminal and the charging port; the MCU may be specifically configured to transmit the data in accordance with UART format to the UART port of the processor of the power adapter through the second link.

Optionally, the firmware upgrade information data is the information downloaded from the network by the AP in the mobile terminal through the radio frequency controller.

Optionally, the processor 1020 may be specifically configured to transmit the firmware upgrade information data to the processor of the power adapter through the data line in the charging port during the process that the power adapter uses the normal charging mode to charge the mobile terminal 1000. The processor 1020 may further be configured to switch from the normal charging mode to the fast charging mode after the power adapter upgrades the firmware of the power adapter according to the firmware upgrade information data, wherein the charging speed of the fast charging mode is greater than the charging speed of the normal charging mode.

Optionally, the charging port may be the USB port. The data line in the charging port is at least one of the D+ line and the D− line in the USB port.

Figure 11:
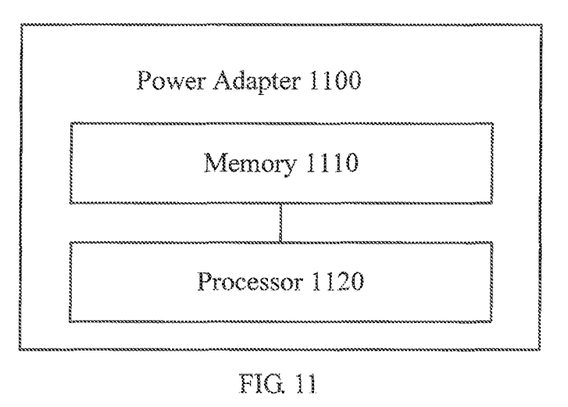
FIG. 11 is a schematic block diagram of a power adapter according to one embodiment of the present disclosure.

FIG. 11 is a schematic block diagram of a power adapter according to one embodiment of the present disclosure. A power adapter 1100 in FIG. 11 includes:

a memory 1110 configured to store a program;

a processor 1120 configured to execute the program, when the program is executed, the processor 1120 being configured to receive the firmware upgrade information data of the power adapter 1100 from the mobile terminal through the data line in the charging port during the process that the power adapter 1100 is electrically coupled to the mobile terminal through the charging port; upgrade the firmware of the power adapter 1100 according to the firmware upgrade information data.

According to the embodiment of the present disclosure, the mobile terminal is utilized to download the firmware upgrade information data of the power adapter, and the most updated firmware update information is transmitted to the power adapter during the process that the mobile terminal is electrically coupled to the power adapter, the power adapter is thus upgraded to solve the problem that the power adapter is difficult to upgrade.

Optionally, the processor 1120 may be specifically configured to receive the data in accordance with UART format transmitted by the mobile terminal through the UART port of the processor 1120. The data in accordance with UART format is formed by converting the firmware upgrade information data by the mobile terminal.

Optionally, the processor 1120 may be specifically configured to receive the data in accordance with UART format transmitted from the GPIO port of the AP of the mobile terminal through the UART port of the processor 1120. The GPIO port is configured to simulate the UART port to transmit the data in accordance with UART format.

Optionally, the firmware upgrade information data may be the information downloaded from the network by the AP in the mobile terminal through the radio frequency controller.

Optionally, the processor 1120 may further be configured to receive the handshake request message from the mobile terminal, the handshake request message is configured to enquire about the version of the firmware currently used by the power adapter 1100; transmit the handshake response message to the mobile terminal, the handshake response message includes the message indicating the version of the firmware currently used by the power adapter 1100; receive the firmware upgrade information data of the power adapter 1100 from the mobile terminal when the mobile terminal determines that the firmware currently used by the power adapter 1100 needs to be upgraded according to the most updated version indicated by the firmware upgrade information data.

Optionally, the processor 1120 may be specifically configured to receive the firmware upgrade information data of the power adapter 1100 from the mobile terminal through the data line in the charging port during the process that the power adapter 1100 uses the normal charging mode to charge the mobile terminal. The processor 1120 may further be configured to switch the power adapter 1100 from the normal charging mode to the fast charging mode after the power adapter 1100 upgrades the firmware of the power adapter 1100 according to the firmware upgrade information data. The charging speed of the fast charging mode is greater than the charging speed of the normal charging mode.

Optionally, the charging port may be the USB port. The data line in the charging port is at least one of the D+ line and the D− line in the USB port.

The one having ordinary skill in the art understand that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. The one having ordinary skill in the art can use different ways to realize the function for each specific application while such realizations should not go beyond the scope of the present disclosure.

It is understood by the one having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments.

Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method for upgrading firmware of a power adapter, comprising:
   downloading firmware upgrade information data for upgrading firmware of the power adapter by a mobile terminal, wherein the firmware upgrade information data is information downloaded from a network through a radio frequency controller in the mobile terminal;
   converting downloaded firmware upgrade information data into the data in accordance with a Universal Asynchronous Receiver/Transmitter (UART) format by an application processor (AP) of the mobile terminal;
   utilizing a General Purpose Input Output (GPIO) port to simulate the UART port by the AP of the mobile terminal so as to transmit the data in accordance with UART format to a microcontroller unit (MCU) of the mobile terminal; and
   transmitting the data in accordance with UART format to a UART port of a processor of the power adapter by the MCU of the mobile terminal through the data line in a charging port of the mobile terminal; and
   upgrading the firmware of the adapter by the processor based on the received firmware upgrade information data.

2. The method as claimed in claim 1, further comprising:
   sending a handshake request message to the power adapter by the MCU of the mobile terminal, the handshake request message being configured to obtain a current version of the firmware of the power adapter;
   receiving a handshake response message fed back from the power adapter by the MCU of the mobile terminal, the handshake response message including a message indicating the current version of the firmware of the power adapter; and
   determining whether the current firmware of the power adapter needs to be upgraded by the MCU of the mobile terminal according to the version of the current firmware of the power adapter and a latest updated version indicated by the downloaded firmware upgrade information data;
   and wherein transmitting the data in accordance with UART format to the UART port of the processor of the power adapter by the MCU of the mobile terminal through the data line in the charging port comprising:
   transmitting the data in accordance with UART format to the UART port of the processor of the power adapter by the MCU of the mobile terminal through the data line in the charging port when determining that the current firmware of the power adapter needs to be upgraded.

3. The method as claimed in claim 2, further comprising:
   determining whether a power supply device plugged in is the power adapter by the AP of the mobile terminal through a first link, wherein the first link connects a Universal Serial Bus (USB) port of the AP and the charging port of the mobile terminal; and
   switching the mobile terminal from the first link to a second link through a USB switch when determining that the power supply device plugged in is the power adapter, wherein the second link connects the MCU of the mobile terminal and the charging port;
   and wherein transmitting the data in accordance with UART format to the UART port of the processor of the power adapter by the MCU of the mobile terminal through the data line in the charging port comprising:
   transmitting the data in accordance with UART format to the UART port of the processor of the power adapter by the MCU of the mobile terminal through the second link.

4. A method for upgrading firmware of a power adapter comprising:
   receiving firmware upgrade information data, which is converted into data in accordance with a Universal Asynchronous Receiver/Transmitter (UART) format and is transmitted from a General Purpose Input Output (GPIO) port of an application processor (AP) of a mobile terminal, through a UART port of a processor of a power adapter, when the power adapter is electrically coupled to the mobile terminal through the charging port, wherein the firmware upgrade information data is information downloaded from a network through a radio frequency controller in the mobile terminal and the GPIO port is configured to simulate the UART port to transmit the data in accordance with UART format; and
   upgrading firmware of the power adapter by a processor of the power adapter according to the firmware upgrade information data.

5. The method as claimed in claim 4, further comprising:
   receiving a handshake request message from the mobile terminal by the power adapter, the handshake request message configured to enquire about a version of the firmware currently used by the power adapter; and
   transmitting a handshake response message to the mobile terminal by the power adapter, the handshake response message including a message indicating the version of the firmware currently used by the power adapter;
   receiving the firmware upgrade information data of the power adapter from the mobile terminal by the power adapter comprising:
   receiving the firmware upgrade information data of the power adapter from the mobile terminal by the power adapter when the mobile terminal determines that the firmware currently used by the power adapter needs to be upgraded according to a most updated version indicated by the firmware upgrade information data.

6. A mobile terminal comprising:
   a non-transitory memory configured to store instructions; and
   a processor configured to execute the instructions to cause the mobile terminal to:

download firmware upgrade information data of a power adapter, the firmware upgrade information data configured to upgrade firmware of the power adapter, wherein the firmware upgrade information data is information downloaded from a network through a radio frequency controller in the mobile terminal; and convert downloaded firmware upgrade information data into data in accordance with a Universal Asynchronous Receiver/Transmitter (UART) format through an application processor (AP) of the mobile terminal, configured to utilize a General Purpose Input Output (GPIO) port to simulate a UART port by the AP of the mobile terminal to transmit data in accordance with UART format to a Microcontroller Unit (MCU) of the mobile terminal, and configured to transmit the data in accordance with UART format to a UART port of a processor of the power adapter by the MCU of the mobile terminal through the data line in a charging port; when the mobile terminal is electrically coupled to the power adapter through the charging port to facilitate the processor to upgrade the firmware of the power adapter according to the firmware upgrade information data.

7. The mobile terminal as claimed in claim 6, wherein the processor is further configured to execute the instructions to cause the mobile terminal to:

transmit a handshake request message to the power adapter through the MCU of the mobile terminal, the handshake request message configured to enquire about a version of the firmware currently used by the power adapter;

receive a handshake response message transmitted by the power adapter through the MCU of the mobile terminal, the handshake response message including a message indicating the version of the firmware currently used by the power adapter; and determine whether the firmware currently used by the power adapter needs to be upgraded according to the version of the firmware currently used by the power adapter and a most updated version indicated by the downloaded firmware upgrade information data;

wherein the data in accordance with UART format is transmitted to the UART port of the processor of the power adapter through the MCU of the mobile terminal when determining that the firmware currently used by the power adapter needs to be upgraded.

8. The mobile terminal as claimed in claim 7, wherein the processor is further configured to execute the instructions to cause the mobile terminal to:

determine whether a power supply device plugged in is the power adapter through a first link, wherein the first link connects a USB port of the AP and the charging port; and switch the mobile terminal from the first link to a second link through the USB switch when determining that the power supply device plugged in is the power adapter, wherein the second link connects the MCU of the mobile terminal and the charging port;

wherein the data in accordance with UART format is transmitted to the UART port of the processor of the power adapter through the second link.

9. The mobile terminal as claimed in claim 6, wherein the firmware upgrade information data is transmitted to the processor of the power adapter through the data line in the charging port when the power adapter uses a normal charging mode to charge the mobile terminal; and wherein the mobile terminal is further configured to execute the instructions to cause the mobile terminal to:

switch the power adapter from the normal charging mode to the fast charging mode after the power adapter upgrades the firmware of the power adapter according to the firmware upgrade information data, wherein a charging speed of the fast charging mode is greater than a charging speed of the normal charging mode.

10. A power adapter comprising:

a non-transitory memory configured to store instructions; and a processor configured to execute the instructions to cause the mobile terminal to:

receive firmware upgrade information data, which is converted into data in accordance with a Universal Asynchronous Receiver/Transmitter (UART) format and is transmitted from a General Purpose Input Output (GPIO) port of an application processor (AP) of a mobile terminal, through a UART port of a processor of the power adapter, when the power adapter is electrically coupled to the mobile terminal through the charging port, wherein the firmware upgrade information data is information downloaded from a network through a radio frequency controller in the mobile terminal and the GPIO port is configured to simulate the UART port to transmit the data in accordance with UART format; and upgrade firmware of the power adapter through the processor of the power adapter according to the firmware upgrade information data.

11. The power adapter as claimed in claim 10, wherein the processor is further configured to execute the instructions to cause the mobile terminal to:

receive a handshake request message from the mobile terminal, the handshake request message being configured to enquire about a version of the firmware currently used by the power adapter; and transmit a handshake response message to the mobile terminal, the handshake response message including a message indicating the version of the firmware currently used by the power adapter;

receive the firmware upgrade information data of the power adapter from the mobile terminal when the mobile terminal determines that the firmware currently used by the power adapter needs to be upgraded according to a most updated version indicated by the firmware upgrade information data.

12. The power adapter as claimed in claim 10, wherein the firmware upgrade information data of the power adapter is received from the mobile terminal by the power adapter through the data line in the charging port when the power adapter uses a normal charging mode to charge the mobile terminal; and wherein the processor is further configured to execute the instructions to cause the mobile terminal to:

switch the power adapter from the normal charging mode to the fast charging mode after the power adapter upgrades the firmware of the power adapter according to the firmware upgrade information data, wherein a charging speed of the fast charging mode is greater than a charging speed of the normal charging mode.

* * * * *